(12) United States Patent
Kozyuk

(10) Patent No.: US 7,754,905 B2
(45) Date of Patent: Jul. 13, 2010

(54) APPARATUS AND METHOD FOR PRODUCING BIODIESEL FROM FATTY ACID FEEDSTOCK

(75) Inventor: Oleg V. Kozyuk, North Ridgeville, OH (US)

(73) Assignee: Arisdyne Systems, Inc., Cleveland, OH (US)

(*) Notice: Subject to any disclaimer, the term of this patent is extended or adjusted under 35 U.S.C. 154(b) by 82 days.

(21) Appl. No.: 12/167,516

(22) Filed: Jul. 3, 2008

(65) Prior Publication Data

US 2009/0043118 A1 Feb. 12, 2009

Related U.S. Application Data

(60) Provisional application No. 60/973,332, filed on Sep. 18, 2007, provisional application No. 60/954,659, filed on Aug. 8, 2007.

(51) Int. Cl.
*C11C 1/00* (2006.01)
*C10L 1/18* (2006.01)

(52) U.S. Cl. .................. 554/167; 554/30; 554/124; 554/169; 44/308; 44/389

(58) Field of Classification Search .............. 554/30, 554/124, 167, 169
See application file for complete search history.

(56) References Cited

U.S. PATENT DOCUMENTS

| | | | |
|---|---|---|---|
| 3,551,073 A | 12/1970 | Petrovits | |
| 3,852,191 A | 12/1974 | Zucker et al. | |
| 3,937,445 A | 2/1976 | Agosta | |
| 4,127,332 A | 11/1978 | Thiruvengadam et al. | |
| 4,164,506 A * | 8/1979 | Kawahara et al. | ........... 554/167 |
| 4,695,411 A | 9/1987 | Stern et al. | |
| 4,698,186 A | 10/1987 | Jeromin et al. | |
| 4,944,163 A | 7/1990 | Niggemann | |
| 5,492,654 A | 2/1996 | Kozyuk et al. | |
| 5,628,623 A | 5/1997 | Skaggs | |
| 5,810,052 A | 9/1998 | Kozyuk | |
| 5,810,474 A | 9/1998 | Hidalgo | |
| 5,868,495 A | 2/1999 | Hidalgo | |
| 5,931,771 A | 8/1999 | Kozyuk | |

(Continued)

FOREIGN PATENT DOCUMENTS

EP 0948400 7/2003

(Continued)

OTHER PUBLICATIONS

Gogate et al., Cavitation: A technology on teh horizon, 2006, Current Science, vol. 91, No. 1, pp. 35-46.*

(Continued)

*Primary Examiner*—Daniel M Sullivan
*Assistant Examiner*—Yate' K Cutliff
(74) *Attorney, Agent, or Firm*—Pearne & Gordon LLP

(57) ABSTRACT

A method comprising applying a controlled flow cavitation apparatus to a biodiesel production process in order to increase fatty acid alkyl ester yield. A feedstock comprising free fatty acids can be passed through a controlled flow cavitation apparatus at a velocity capable of generating a hydrodynamic cavitation zone where the free fatty acids can be esterified. One or more controlled flow cavitation apparatuses can be applied at various points of a biodiesel production process.

18 Claims, 7 Drawing Sheets

U.S. PATENT DOCUMENTS

| | | | |
|---|---|---|---|
| 5,937,906 A | 8/1999 | Kozyuk | |
| 5,969,207 A | 10/1999 | Kozyuk | |
| 5,971,601 A | 10/1999 | Kozyuk | |
| 6,012,492 A | 1/2000 | Kozyuk | |
| 6,035,897 A * | 3/2000 | Kozyuk | 138/37 |
| 6,386,751 B1 | 5/2002 | Wootan et al. | |
| 6,440,057 B1 | 8/2002 | Ergun et al. | |
| 6,502,979 B1 | 1/2003 | Kozyuk | |
| 6,538,041 B1 | 3/2003 | Marelli | |
| 6,802,639 B2 | 10/2004 | Kozyuk | |
| 6,857,774 B2 | 2/2005 | Kozyuk | |
| 6,878,837 B2 | 4/2005 | Bournay et al. | |
| 6,887,859 B2 | 5/2005 | Clapp et al. | |
| 6,965,044 B1 | 11/2005 | Hammond et al. | |
| 6,982,155 B1 | 1/2006 | Fukuda et al. | |
| 7,086,777 B2 | 8/2006 | Kozyuk | |
| 7,087,178 B2 | 8/2006 | Romanyszyn et al. | |
| 7,122,688 B2 | 10/2006 | Lin et al. | |
| 7,135,155 B1 | 11/2006 | Long et al. | |
| 7,178,975 B2 | 2/2007 | Kozyuk | |
| 7,207,712 B2 | 4/2007 | Kozyuk | |
| 7,247,244 B2 | 7/2007 | Kozyuk | |
| 7,314,306 B2 | 1/2008 | Kozyuk | |
| 7,452,425 B1 | 11/2008 | Langhauser | |
| 2002/0009414 A1 | 1/2002 | Moser et al. | |
| 2002/0054995 A1 | 5/2002 | Mazurkiewicz | |
| 2004/0028622 A1 | 2/2004 | Gurin | |
| 2004/0254387 A1 | 12/2004 | Luxem et al. | |
| 2005/0027173 A1 | 2/2005 | Briscoe et al. | |
| 2005/0136520 A1 | 6/2005 | Kinley et al. | |
| 2005/0274065 A1 | 12/2005 | Portnoff et al. | |
| 2006/0094890 A1 | 5/2006 | Sharma et al. | |
| 2007/0066480 A1 | 3/2007 | Moser et al. | |
| 2007/0152355 A1 | 7/2007 | Hartley | |
| 2007/0161095 A1 | 7/2007 | Gurin | |
| 2008/0044891 A1 | 2/2008 | Kinley et al. | |
| 2008/0099410 A1 | 5/2008 | Sprague | |
| 2008/0277264 A1 | 11/2008 | Sprague | |

FOREIGN PATENT DOCUMENTS

| | | |
|---|---|---|
| GB | 2016940 | 9/1979 |
| JP | 2004-250436 | 9/2004 |
| KR | 10-2003-0066246 A | 8/2003 |

OTHER PUBLICATIONS

Gogate et al., A review and assessment of hydrodynamic cavitation as a technology for the future, 2005, Ultrasonics Sonochemistry, vol. 12, pp. 21-27.*

Kelka et al., Cavitation as a Novel Tool fo Process Intensification of Biodiesel synthesis, Jan. 2007, Presented at 6th International Symposium on Catalysis in Multiphase Reactors, Pune, India, 2 pages.*

Notification Of Transmittal Of The International Search Report And The Written Opinion Of the International Searching Authority, Or The Declaration; Written Opinion Of The International Searching Authority; International Search Report; PCT/US2008/078923, Arisdyne Systems, Inc. et al; Filed Oct. 6, 2008.

"Biodiesel production," taken from Wikipedia, the free encyclopedia, http://en.wikipedia.org/wiki/Biodiesel_production, printed on May 21, 2008, 5 pages.

International Search Report (PCT/US2008/069170) dated Sep. 25, 2008.

* cited by examiner

US 7,754,905 B2

APPARATUS AND METHOD FOR PRODUCING BIODIESEL FROM FATTY ACID FEEDSTOCK

CROSS-REFERENCE TO RELATED APPLICATIONS

This application claims the benefit of U.S. provisional application Ser. Nos. 60/954,659 filed Aug. 8, 2007 and 60/973,332 filed Sep. 18, 2007, the contents of which are incorporated herein in their entirety by reference.

FIELD OF THE INVENTION

The present invention relates generally to biodiesel production and more particularly to biodiesel production using a controlled flow cavitation apparatus.

BACKGROUND OF THE INVENTION

Biodiesel is a non-petroleum-based diesel fuel. Production of fatty acid alkyl esters for use as biodiesel comprises the transesterification of fatty acids of a feedstock into fatty acid alkyl esters. Natural fats and oils that make up the feedstocks for biodiesel production generally contain free fatty acids as either a naturally occurring component or as a result of an enzymatic decomposition process.

Generally, the transesterification reaction is carried out in the presence of an alcohol and a catalyst. Conventional methods of biodiesel production utilize either a batch reactor or a continuous process. These methods do not yield a conversion of fatty acids to fatty acid alkyl esters at a rate above 99%. The reaction times can also vary from several minutes to several hours. Batch process reactions are easy to control but are often cost ineffective due to ineffective mixing methods and long reaction times. Continuous transesterification processes can reduce the reaction times but have been unable to provide efficient mixing necessary to reduce the time and cost to produce biodiesel.

Accordingly, there is a need in the art for an apparatus and method of converting fatty acids to fatty acid alkyl esters that is cost effective and reduces reaction time. The apparatus and method can be easily retrofitted into an existing biodiesel production process. The apparatus and method can provide effective mixing such that the conversion rate of fatty acid into fatty acid alkyl esters is sufficiently high, and preferable above 90%.

SUMMARY OF THE INVENTION

A method for preparing a fatty acid alkyl ester from a feedstock comprising providing a feedstock comprising at least one source of fatty acids. The feedstock is mixed with a treatment composition comprising alcohol and a catalyst to form a reaction mixture. The reaction mixture is preferably in the range of 40° to 200° C. The reaction mixture is forced through at least two controlled flow cavitation apparatuses at a processing pressure capable of generating a hydrodynamic cavitation zone in each apparatus. A pressure differential across each controlled flow cavitation apparatus is preferably maintained in the range of 30 to 500 psi. At least one of the fatty acids from the source of fatty acid is converted into a fatty acid alkyl ester.

A method of increasing the conversion rate of fatty acid to fatty acid alkyl ester comprising combining a feedstock comprising fatty acids with an alcohol and a catalyst to form a reaction mixture. The reaction mixture is preferably in the range of 40° to 200° C. The reaction mixture is passed through at least two controlled flow cavitation apparatuses to convert the fatty acids in the feedstock to fatty acid alkyl esters through a transesterification reaction. The conversion rate of fatty acids in the feedstock to fatty acid alkyl esters is preferably greater than 90%.

BRIEF DESCRIPTION OF THE DRAWINGS

Aspects of the invention will be appreciated by a person having ordinary skill in the art based on the following description with reference to the following drawings, which are provided by way of illustration and not limitation.

DETAILED DESCRIPTION OF PREFERRED EMBODIMENTS

Herein, when a range such as 5-25 (or 5 to 25) is given, this means preferably at least 5 and, separately and independently, preferably not more than 25.

The use of a controlled flow cavitation apparatus in a biodiesel production process can both reduce the transesterification reaction time and increase the conversion rate of fatty acids to fatty acid alkyl esters, otherwise known as biodiesel fuel. Apparatuses 12 capable of generating a controlled flow cavitation, as applied during the reaction phase of biodiesel production, can impart a high level of energy into the reaction mixture, which acts to increase the transesterification rate of fatty acids to fatty acid alkyl esters. The energy generated from controlled flow cavitation acts to effectively mix and introduce alcohol to the reaction sites on the fatty acid chains at a quicker rate than conventional methods. Application of a controlled flow cavitation apparatus to the biodiesel production process has multiple benefits, such as an increase in the mixing efficiency, a decrease in reaction time, increase in the conversion rate, and a reduction in production costs and time.

The fatty acids used in the transesterification reaction can be supplied from feedstocks containing at least one source of fatty acids, such as oils and animal fats. The at least one source of fatty acids can be, for example, soybean, corn, sunflower, palm, jatropha, nut, safflower, olives, cotton, linseed, mustard seed, rapeseed, canola, peanuts, coconut, castor beans, tall oil, algae, raw or rendered animal fats, brown grease, white grease, yellow grease, lard or tallow from pork, chicken, mutton, beef, horse, or combinations thereof. The at least one source of fatty acids can also be wastes, effluents and/or residues from the processing oils or animal fats. The feedstock 1 can comprise multiple sources of fatty acids, such as a blend of oils and/or animal fats.

Figure 1:
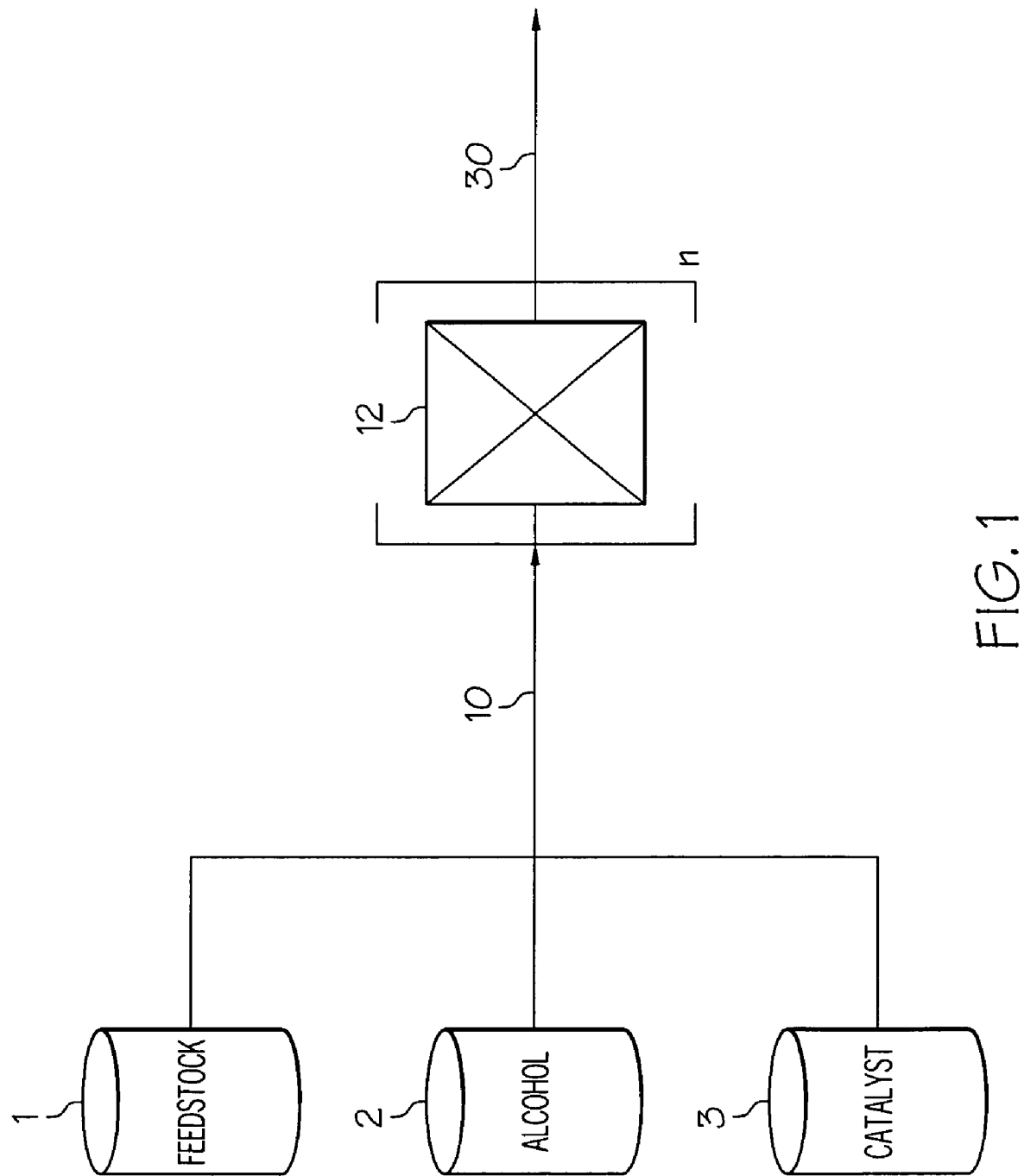
FIG. 1. is a schematic of a biodiesel production process using at least one controlled flow cavitation apparatus according to an embodiment of the invention.

A process for preparing biodiesel using a controlled flow cavitation apparatus is shown in FIG. 1. As shown, feedstock 1, alcohol 2 and catalyst 3 are combined to form a reaction mixture 10 that can be forced through the controlled flow cavitation apparatus 12. The feedstock 1 used in the process preferably comprises at least one source of fatty acids as described above. One preferred source of fatty acid is soy oil, which includes crude de-gummed once refined soy oil, fully refined soy oil, and RBD soy oil (refined, bleached and deodorized). The preferred composition of the soy oil has less than 1.5% of free fatty acid and less than 200 ppm phosphorus. These specifications and others are defined by the National Oilseed Processors Association (NOPA) Trading Rule 103, §3, the contents of which are incorporated herein by reference in their entirety. The feedstock can also comprise other components that do not provide a fatty acid source. For example, the feedstock 1 can comprise solvents, buffers, surfactants, water and/or residual processing aids and impurities. The alcohol 2 can be a conventional alcohol or a mixture of alcohols. For example, the alcohol can be a lower mono- or branched-alcohol having 1 to 5 carbon atoms, such as methanol or ethanol. The catalyst 3 can be acidic or basic. Suitable catalysts can include alkali metal hydroxides such as sodium or potassium hydroxide, sodium methoxide, potassium ethoxide, alkali metal alcoholates such as sodium methylate, acidic compositions such as sulfuric acid. Other catalysts can include biocatalysts such as lipases or solid catalysts such as alumina or clay.

The reaction mixture 10 can comprise varying amounts of a fatty acid source 1, alcohol 2 and catalyst 3. For example, the ratio of fatty acid source/alcohol/catalyst can be 0.1-5/1-10/0.01-1. As shown in the Examples below, the ratio can be 1/6/0.22.

Figure 3:
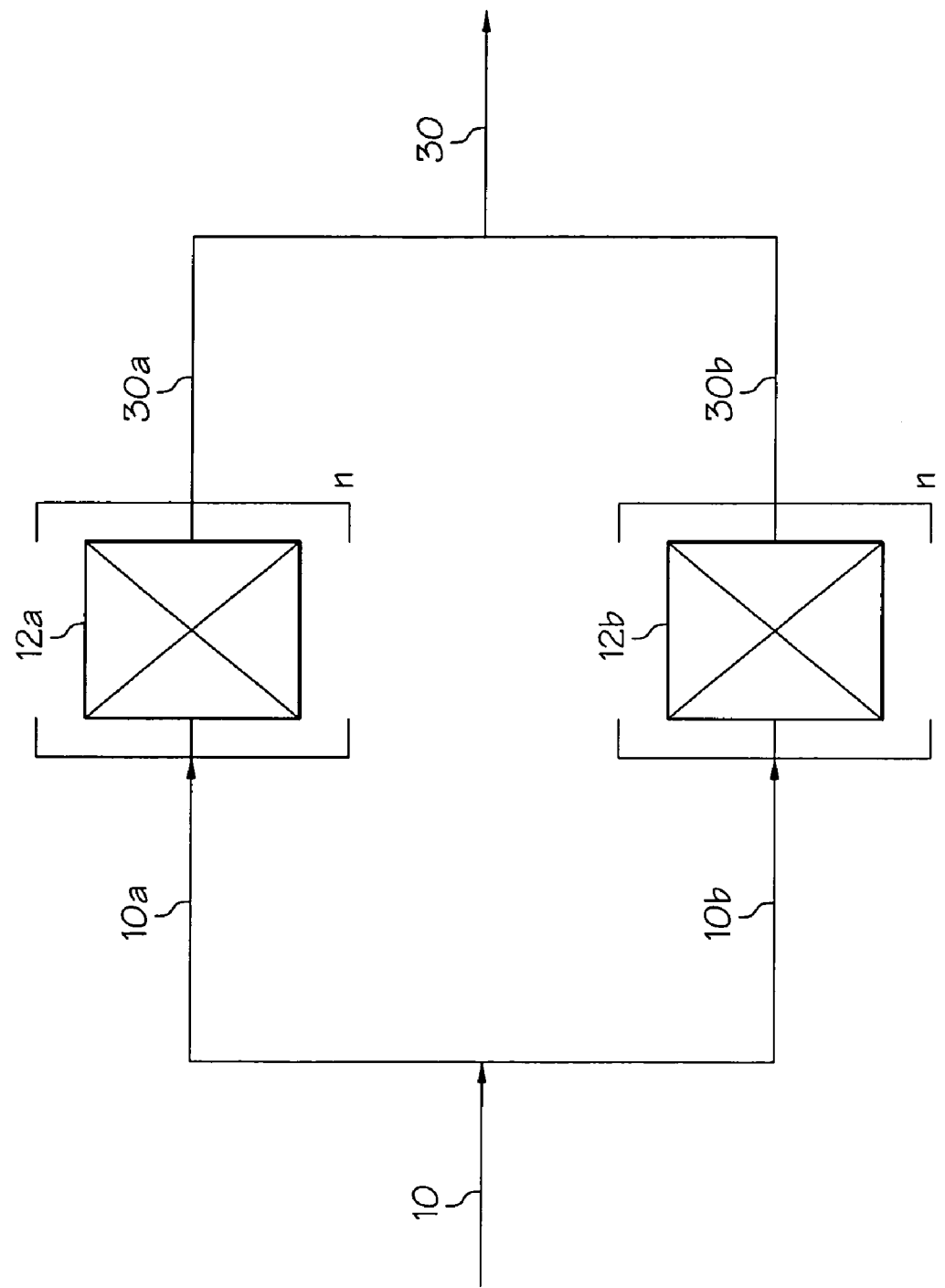
FIG. 3 is a schematic of controlled flow cavitation apparatuses in a parallel arrangement for use in a biodiesel production process.
Figure 4:
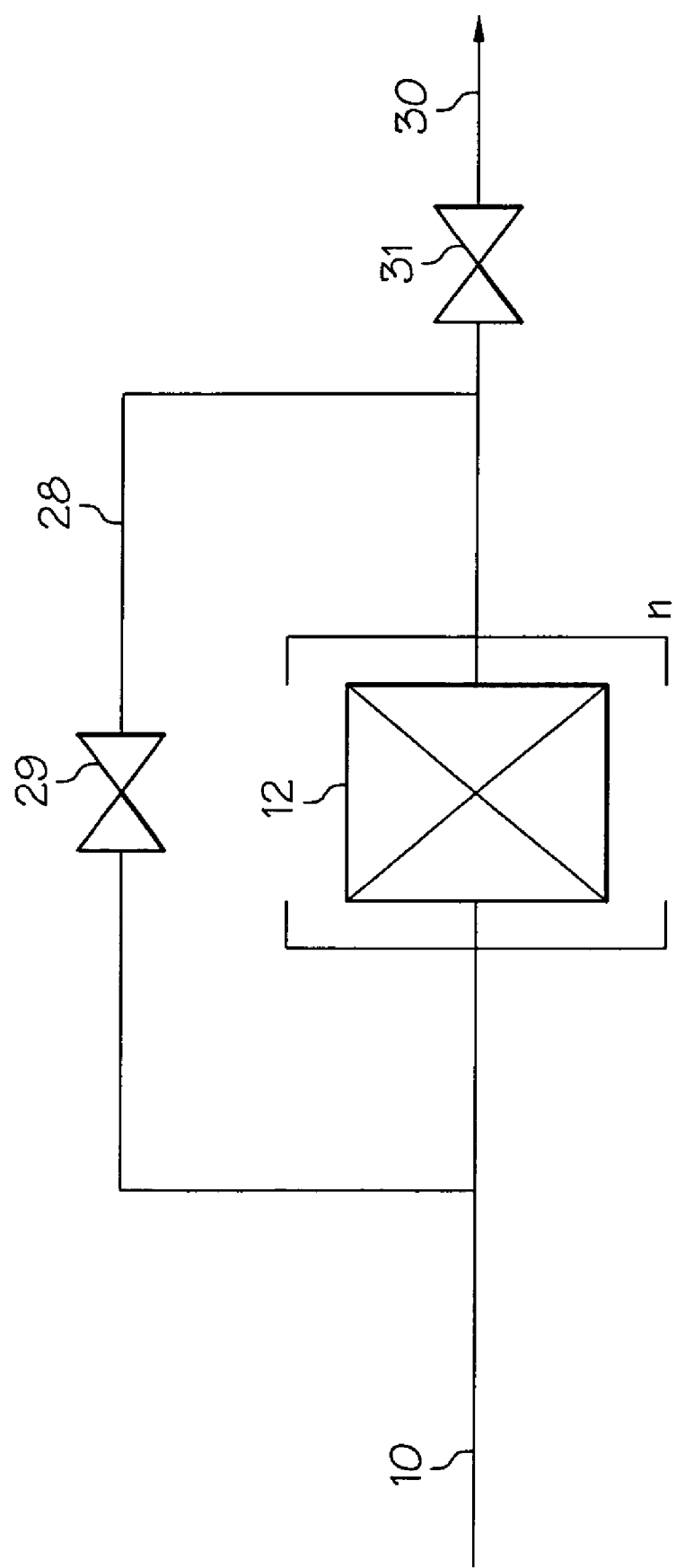
FIG. 4 is a schematic of at least one controlled flow cavitation apparatus in a recirculation loop configuration for use in a biodiesel production process.
Figure 5:
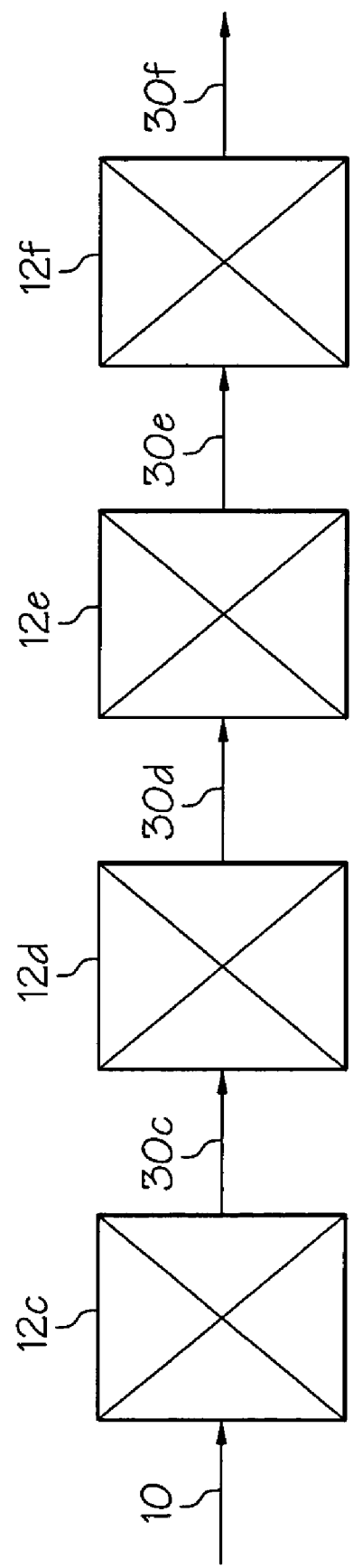
FIG. 5 is a schematic of four controlled flow cavitation apparatuses in series arrangement for use in a biodiesel production process.

The reaction mixture 10 of FIG. 1 is forced through a controlled cavitation apparatus 12 with conventional processing equipment, such as a pump (not shown in FIG. 1). The reaction mixture 10 can pass through one or multiple controlled flow cavitation apparatuses 12. FIG. 1 illustrates that multiple controlled flow cavitation apparatuses can be used, wherein the number of apparatuses used is represented by the integer "n." The integer "n" can indicate any number of apparatuses. For example, the integer "n" can be in the range of 1 to 100, preferably 1 to 50, more preferably 1 to 25, more preferably 1 to 10, or about 2, 3, 4, 5, 6, 7, 8 or 9 apparatuses. The arrangement of the apparatuses is unlimited. For example, multiple apparatuses can be arranged in series, in parallel or a combination thereof. Preferably, the apparatuses are in direct fluid connection with one another. For example, in a series of at least two controlled flow cavitation apparatuses 12, the reaction mixture 10 can pass or flow through a first apparatus and directly into a second apparatus without substantially interruption, such as a processing pump between the two apparatuses in series. It is believed that a valve or monitoring equipment such and pressure or temperature gauges is not sufficient to provide a substantial interruption of flow. For instance, a valve, during normal operation, would be open and not create interruption in the flow or a significant pressure drop. In one embodiment, and as shown in FIG. 5, the reaction mixture 10 can be forced through a series of at least two controlled flow cavitations apparatuses. FIGS. 3 and 4, further described below, illustrate other configurations.

The process of FIG. 1 prepares fatty acid alkyl esters by carrying out a transesterification reaction of a fatty acid and an alcohol 2 in the presence of a catalyst 3. The transesterification reaction of the fatty acid and alcohol 2 occurs in the controlled flow cavitation apparatus as described below. Processing stream 30 or the reaction product exiting the controlled flow cavitation apparatus 12 comprises the fatty acid alkyl esters formed from the transesterification reaction of the fatty acids contained in the reaction mixture 10. The reaction product 30 can also comprise unreacted fatty acids, catalyst and unreacted alcohol. The conversion rate of fatty acid in the reaction mixture to fatty acid alkyl ester contained in the reaction product 30 can be greater than 90%, preferably greater than 95%, or more preferably greater than 96%, 97%, 98% or 99%.

Figure 2:
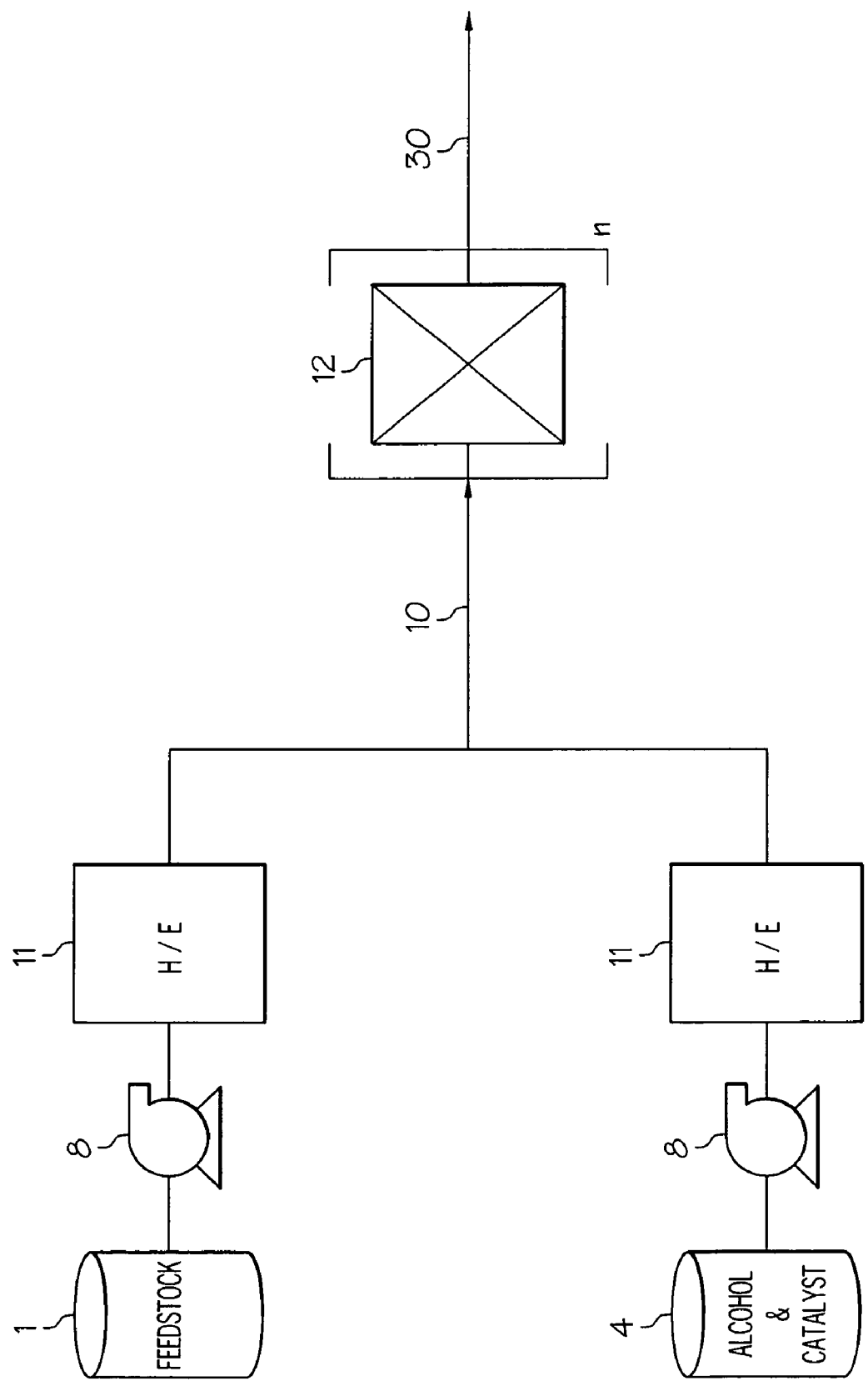
FIG. 2 is a schematic of a biodiesel production process using at least one controlled flow cavitation apparatus according to an embodiment of the invention.

FIG. 2 illustrates one embodiment for introducing the reaction mixture 10 into a controlled flow cavitation apparatus 12. As shown, the feedstock 1 is forced through a heat exchanger 11 by a pump 8. The heat exchanger 11 can raise the temperature of the feedstock 1 prior to being combined with alcohol 2 and a catalyst 3 to form a reaction mixture 10. The heat exchanger 11 preferably raises the temperature of the feedstock 1 to a temperature in the range of 40 to 200° C. For example, the temperature of the feedstock 1 can be raised to 60°, 80°, 90°, 100°, 120° or 150° C. The alcohol and catalyst can be pre-mixed and stored prior to being combined with the feedstock 1. A pump 8 can be used to pass the alcohol and catalyst mixture 4 through a heat exchanger 11, which can raise the temperature of the alcohol and catalyst mixture to a temperature in the range of 40 to 200° C. For example, the temperature of the alcohol and catalyst mixture 4 can be raised to 60°, 80°, 90°, 100°, 120° or 150° C. The feedstock 1, alcohol and catalyst mixture 4, pumps 8 and heat exchangers 11 are preferably in fluid communication with each other through the use of pipes or hoses, or other conventional industrial equipment. The pre-heated feedstock and pre-heated alcohol and catalyst mixture 4 are combined to form a reaction mixture 10. The reaction mixture 10 passes through a controlled cavitation apparatus 12 with conventional processing equipment, such as a pump. As discussed above, the reaction mixture 10 can pass through one or multiple apparatuses 12, which can be arranged in series or in parallel, or a combination thereof. If multiple controlled flow cavitation apparatuses 12 are used, the integer "n" can be in the range of 1 to 100, preferably 1 to 50, more preferably 1 to 25, more preferably 1 to 10, or about 2, 3, 4, 5, 6, 7, 8 or 9 apparatuses.

FIG. 3 illustrates one embodiment of an arrangement of at least two controlled flow cavitation apparatuses 12. Two or more controlled cavitation apparatuses 12 can be arranged in parallel with one another. In a parallel arrangement, the reaction mixture 10 is split between the number or sets of controlled flow cavitation apparatuses 12 that are in a parallel configuration. As shown, the reaction mixture 10 is divided into two reaction mixture streams 10a, 10b. Reaction mixture 10a passes through a first controlled flow cavitation apparatus 12a or set of apparatuses if the integer "n" is greater than 1. Reaction mixture 10b passes through a second controlled flow cavitation apparatus 12b or set of apparatuses if "n" is greater than 1. The reaction products 30a, 30b from the first and second apparatuses 12a, 12b in parallel are combined to form a single reaction product stream 30 comprising fatty acid alkyl esters.

FIG. 4 illustrates one embodiment of a controlled flow cavitation apparatus 12 arranged in a recirculation loop 28. The recirculation loop 28 allows for a portion of the reaction product 30 exiting the controlled flow cavitation apparatus 12 to be re-passed through the apparatus 12. A control valve 29 in the recirculation loop 28 or a control valve 31 in the pipe or tube downstream of the recirculation loop can be used to adjust the amount of the reaction product exiting the apparatus 12 being passed through the apparatus 12 for a second time. For example, 1 to 99 percent of the reaction product flow exiting the apparatus 12 can be recirculated back through the apparatus 12 for a second time by adjusting valve 29, 31, or a combination thereof. As shown, the flow through the recirculation loop 28 can be passed through one or multiple controlled flow cavitation apparatuses 12, depending on whether the integer "n" is greater than 1. In theory, without being bound thereto, if one controlled flow cavitation apparatus 12 is used, the recirculation loop 28 can act to simulate a series of controlled flow cavitation apparatuses 12 as shown, for example, in FIG. 5. The conversion rate of fatty acid to fatty acid alkyl ester in the amount of reaction product exiting the controlled flow apparatus 12 and being recirculated back through the apparatus 12 for a second time would be similar to the conversion rate if that same amount was passed through two controlled flow cavitation apparatuses 12 in series. The recirculation loop 28 can increase conversion rate of fatty acid to fatty acid alkyl ester. Depending on the amount of reaction product being recirculated, additional apparatuses 12 in series can be reduced without reducing the overall conversion rate.

Turning to FIG. 5, multiple controlled flow cavitation apparatuses 12c-12f can be arranged in series such that the reaction product stream 30c-30f can flow through successive downstream apparatuses 12. As shown, there are four controlled flow cavitation apparatuses 12c-12f in series. The reaction mixture 10 passes through apparatus 12c to produce reaction product stream 30c. In a sequential manner, reaction product stream 30c passes through apparatus 12d to produce reaction product stream 30d. This sequence is the same for apparatuses 12e and 12f. Arranging multiple controlled flow cavitation apparatuses 12 in series increases the overall conversion rate of fatty acid to fatty acid alkyl ester. For example, the conversion rate can be about 99% or greater if multiple apparatuses 12 are used in series. Any unreacted fatty acid in the reaction product streams 30c-30f can be reacted in a downstream apparatus 12.

The invention can be practiced by using any of the known controlled flow cavitation apparatuses, such as those described in U.S. Pat. Nos. 5,810,052; 5,931,771; 5,937, 906; 5,971,601; 6,012,492; 6,502,979; 6,802,639; and 6,857,774, the entire contents of which are incorporated herein by reference.

Figure 6:
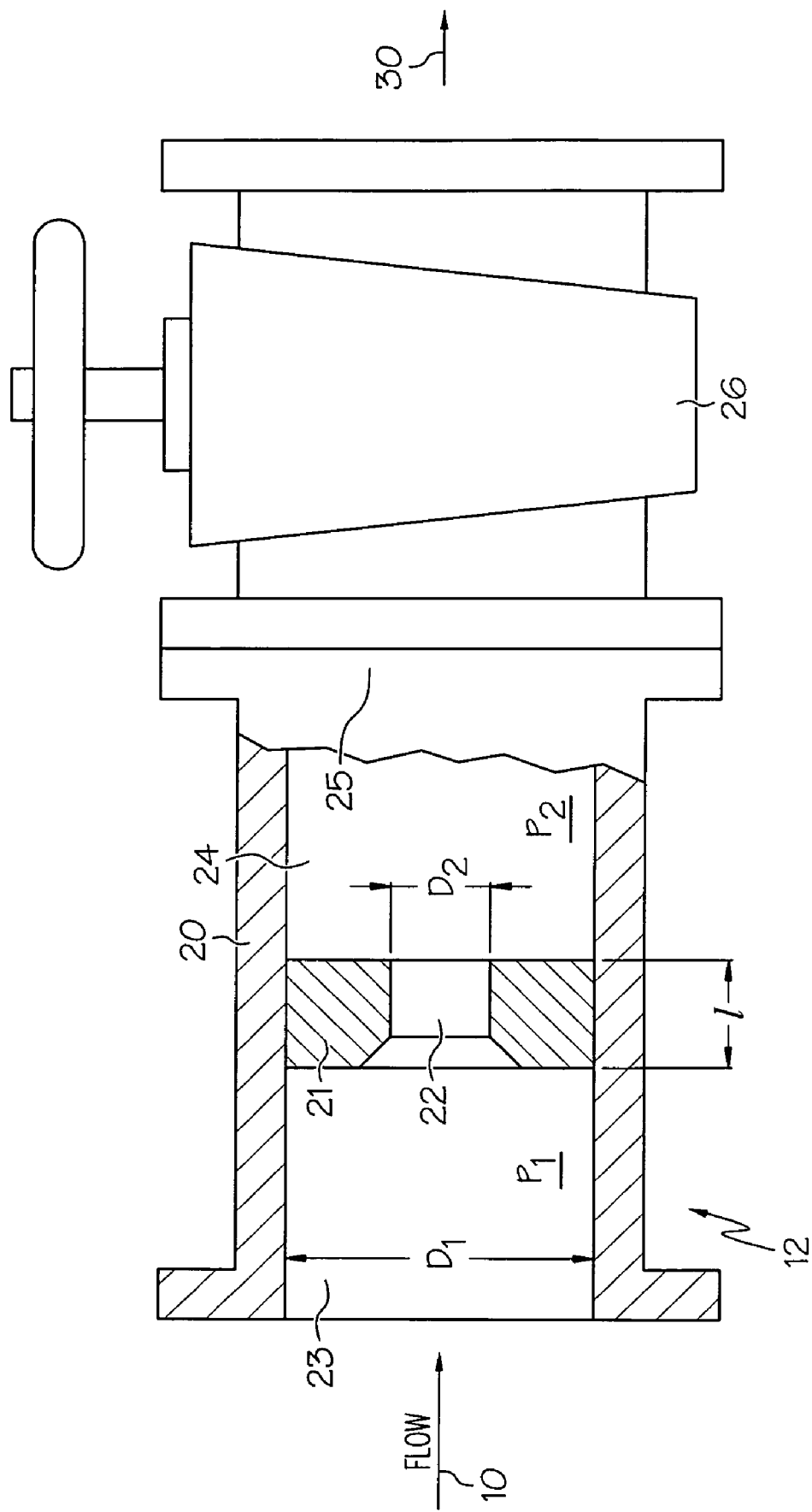
FIG. 6 is a cross section view of a controlled flow cavitation apparatus according to an embodiment of the invention.

FIG. 6 provides a cross section view of one embodiment of the present invention in which a controlled flow cavitation apparatus 12 can process a reaction mixture 10. The controlled flow cavitation apparatus 12 comprises a flow-through channel 20 comprising a first chamber 23 and a second chamber 24. The first chamber 23 and second chamber 24 of the flow-through channel 20 are divided by a localized flow constriction 21. The first chamber 23 is positioned upstream of the localized flow constriction 21 and the second chamber 24 is positioned downstream of the localized flow constriction 21, as viewed in the direction of movement of flow, such as a reaction mixture 10. Localized flow constriction 21 can be achieved by a diaphragm with one, or more, orifices 22, baffles, nozzles or the like. Although not shown, the flow-through channel can have two or more localized flow constrictions 21 in series. For example, a first localized flow constriction 21 can have one orifice 22 having a first diameter and a second localized flow constriction 21 can have one orifice 22 having a second diameter, wherein the first localized flow constriction is upstream of the second localized flow constriction. The first and second diameters of the in-series orifices 22 can be the same or vary, such as the first orifice 22 diameter being smaller or larger than the second orifice 3 diameter.

As the reaction mixture 10 comprising feedstock 1, alcohol 2, and catalyst 3 passes through the cavitation apparatus 12, the feedstock 1 and alcohol 2 are reacted in the presence of the catalyst 3. The reaction takes place in the local hydrodynamic cavitation zone. The product of the reaction is a reaction product stream 30 that comprises fatty acid alkyl esters, unreacted fatty acid, catalyst, unreacted alcohol and optionally glycerol. In a preferred embodiment, the reaction mixture 10 passes through four controlled flow cavitation apparatuses 12. Feedstock 1 and the alcohol 2 are reacted in each of the hydrodynamic cavitation zones. After passing through each of the first, second, and third apparatuses, an intermediate reaction product stream is formed that comprises fatty acid esters, unreacted fatty acid, catalyst, unreacted alcohol and optionally glycerol.

The hydrodynamic cavitation zone is produced as a function of one or more of the temperature of the reaction, the pressure drop across the constriction 21, 22, and the residence time across the restriction orifice 22. A pressure differential is created by the flow of the reaction mixture 10 as it passes over and through the local restriction orifice 22 or orifices (not shown) of each cavitation apparatus 12. The magnitude of the pressure differential is controlled by the size of the orifice 22, the flow rate of the reaction mixture 10, and a localized hydraulic resistance 26 downstream of the apparatus 12.

The restriction of flow in the controlled flow cavitation apparatus 12 can be provided by localized flow constriction 21, such as an orifice 22, baffle, nozzle or the like. As shown in FIG. 6, the controlled flow cavitation apparatus 12 comprises one annular orifice 22. The orifice 22 of the apparatus can be any shape, for example, cylindrical, conical, oval, right-angled, square, etc. Depending on the shape of the orifice 22, this determines the shape of the cavitation jets flowing from the localized flow constriction 21. The orifice 22 can have any diameter, $D_2$. For example, the diameter can be in the range of about 10 μm to 10 mm, preferably between 50 μm and 5 mm, more preferably between 100 μm and 1 mm, or can be 0.5 mm, or 0.75 mm. The localized flow constriction 21 can also be a baffle. The baffle can extend from the wall of the flow-through channel 20. The baffle can be of any size and shape, and thus can be configured to interrupt flow of the reaction mixture 10 such that the pressure differential across the apparatus 12 can be controlled.

As shown in FIG. 6, at outlet 25 from the second chamber 24, a localized hydraulic resistance 26 can be used to maintain back pressure in the flow-through channel 20, the first chamber 23 or second chamber 24. The localized hydraulic resistance 26 can be valve as known in the art, such as a ball valve, butterfly valve, globe valve, needle valve or gate valve. As shown, the first chamber 23 has a pressure $P_1$ and the second chamber 24 has a pressure $P_2$. Flow into the apparatus 10 can be provided with the aid of fluid pumping devices as known in the art, such as a pump, centrifugal pump, rotodynamic pump, positive-displacement pump or diaphragm pump. As discussed herein, pressure $P_1$ is defined as the processing pressure for the controlled flow cavitation apparatus 10. The processing pressure is preferably at least 120, preferably at least 150 psi, preferably at least 200 psi, and more preferably at least 250 psi.

The processing pressure is reduced as the reaction mixture 10 passes through the flow-through channel 20 and orifice 22. Maintaining a pressure differential across the localized flow constriction 21 or orifice 22 allows control of the cavitation intensity in the flow through channel 20. The pressure differential across the localized flow constriction 21 or orifice 22 is at least 100, 120, 140, 150, 170, 200, 250, or 300 psi. Preferably, a pressure differential across a controlled flow cavitation apparatus 12 can be maintained in the range of 30-500, preferably 30-250, more preferably 30-200 or about at least 40, 60, 100, 120, 140, 150, 170, 200, 250, or 300 psi. In the embodiment illustrated in FIG. 5, the pressure differential across the first 12c, second 12d, third 12e, and fourth 12f apparatus can be in the range of 30-500, 30-300, and 30-250 psi. More preferably, the pressure differential across the first 12c, second 12d, third 12e, and fourth 12f apparatuses can be 250, 120, 120 to 250, and 60 psi, respectively. The flow rate of the reaction mixture 10 through the one or more orifices 22 in the controlled flow cavitation apparatus 12 is preferably at least 0.1; 1; 10; 100; 1,000; 10,000; or 100,000 liters per minute (lpm).

Flow of the reaction mixture 10 across the orifice 22 or orifices (not shown) create a hydrodynamic cavitation zone that promotes a high density of cavitation power dissipation locally inside the flow-through channel 20, and more preferably in the orifice 22 chamber (l) and downstream of the orifice 22 in the second chamber 24. The high energy dissipation in the hydrodynamic cavitation zone causes the formation, growth, and eventual implosive collapse of vapor bubbles within the liquid. This collapse then releases a tremendous amount of energy which acts to break apart the fatty acids and facilitate an increased number in reaction sites for the alcohol to attack.

Hydrodynamic cavitation zone in the orifice chamber (l) and second chamber 24 arises in the fluid jets of the reaction mixture 10 flowing from the orifice 22 in the form of intermingling cavitation bubbles and separate cavitation cavities. The length (l) in orifice 22 in localized flow constriction 21 is selected in such a manner in order that the residence time of the cavitation bubble in the orifice 22 and/or the second chamber 24 does not exceed 1 second or preferably 0.1 second. Thus, the hydrodynamic cavitation zone comprises the orifice 22 and second chamber 24. The reaction mixture 10 is maintained in the hydrodynamic cavitation zone of at least one apparatus 12 for preferably less than 1 second, preferably less than 0.1 second, preferably less than 0.01 second, preferably less than 0.001 second, preferably less than 0.0001 second, preferably less than 0.000001 second, and preferably less than 0.0000005 second. In one preferred embodiment as shown in FIG. 5, the residence time of the reaction mixture 10 in the hydrodynamic cavitation zone is preferably not more than 0.12 microseconds across a first cavitation apparatus 12c, preferably not more than 0.17 microseconds across a second cavitation apparatus 12d, preferably not more than 0.17 microseconds across a third cavitation apparatus 12e, and preferably not more than 0.25 microseconds across a fourth cavitation apparatus 12f The time in the hydrodynamic cavitation zone needed to facilitate the transesterification reaction is much smaller than the time needed to facilitate the same or similar transesterification reaction in conventional methods, such as batch reactor processes and continuous transesterification processes, and thus the controlled flow cavitation apparatus can unexpectedly reduce processing time and costs associated with the biodiesel production process. Further, hydrodynamic cavitation is more efficient than acoustic cavitation and much more efficient than conventional agitation and/or heating methods. The scale-up of hydrodynamic cavitation apparatuses is relatively easy compared to other methods, which makes it well suited to the processing of dispersions and solutions, such as those present in a biodiesel production process. As shown herein, the arrangement of at least two controlled flow cavitation apparatuses in series provides an efficient method of converting fatty acids to fatty acid alkyl esters that reduces processing time, energy, costs, and equipment.

The given dynamic pressure and residence time of the bubble in the localized flow constriction 21 and orifice 22 allows for production of cavitation bubbles and cavities in the reaction mixture 10 flow. The cavity sizes are dependent on the magnitude of the dynamic pressure jet as well as the sizes of orifice 22 in the localized flow constriction 21. Increase of the dynamic pressure jet as well as size of orifice 22 leads to the increase in the sizes of cavitation bubbles. Increase of the dynamic pressure of the cavitation fluid jet also promotes increase of the concentration of cavitation bubbles. Therefore, given the dynamic pressure of the cavitation fluid jet, its shape, and the number of fluid jets, it is possible to produce a cavitation zone of cavitation bubbles and their required concentration and sizes. Cavitation bubbles and cavities together with the liquid jets enter into the second chamber 24, where they collapse under the influence of static pressure $P_2$. The energy emitted during collapse of cavitation bubbles is directly proportional to the magnitude of the static pressure in the surrounding liquid bubbles. Therefore, the greater the magnitude of $P_2$ the greater the energy emitted during collapse of cavitation bubbles and the better the dispersion and/or size reduction effect. In other words, the level of energy dissipation in the reaction mixture 10 increases as the magnitude of $P_2$ increases and thus the severity or hardness of collapse of each cavitation bubble separately increases, as well as the level of energy dissipation due to the decrease of the volume in which these bubbles collapse.

As discussed above, the magnitude of static pressure $P_2$ in second chamber 24 is maintained due to the location of the additional localized restriction 26 at the outlet from this chamber. The additional localized restriction may be adjustable or non-adjustable. By utilizing the adjustable additional localized resistance 26 it is possible to control the severity or hardness of cavitation influence and in the same process, the cavitation dispersion and conversion rate of fatty acids to fatty acid alkyl esters formed by the transesterification reaction.

Figure 7:
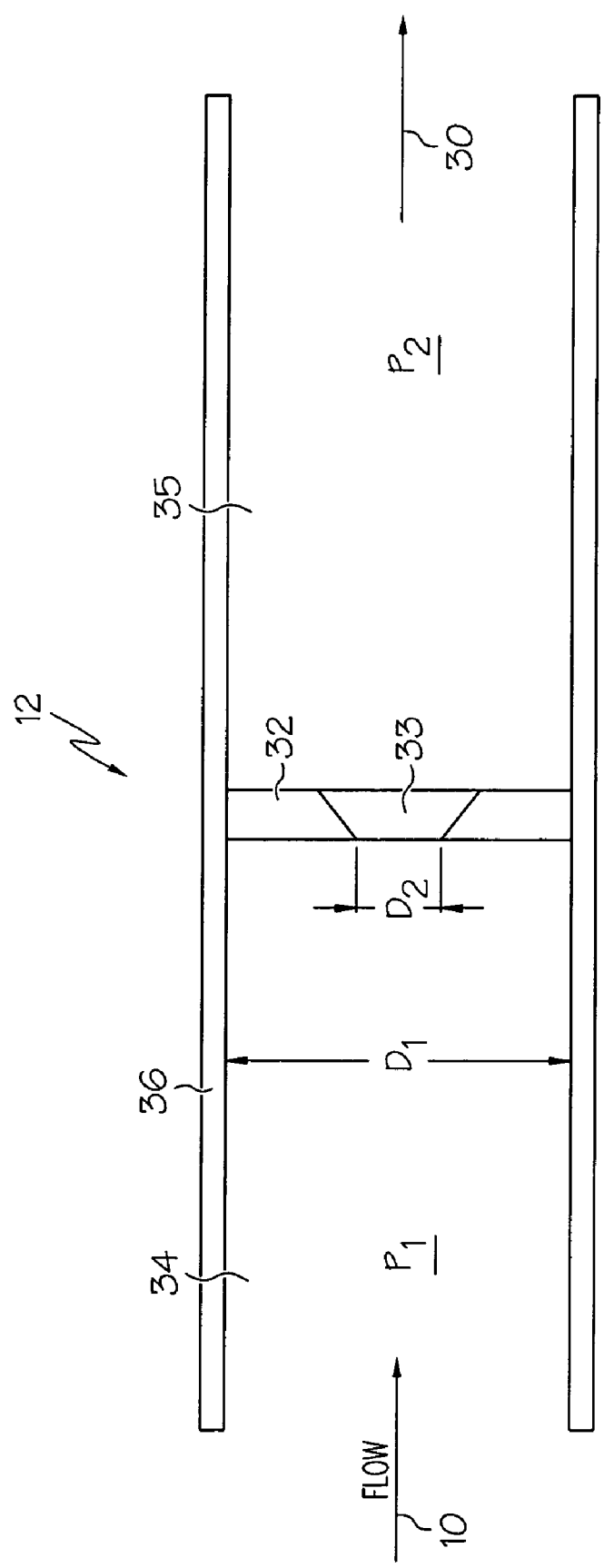
FIG. 7 is a cross section view of a controlled flow cavitation apparatus according to an embodiment of the invention.

In another embodiment, FIG. 7 illustrates a controlled flow cavitation apparatus 12, wherein the sharp-edged orifice 33, positioned in the localized flow constriction 32, has a diameter, $D_2$. Diameter $D_2$ can be in the range of 0.1 to 10 mm as described above, and preferably less than 10 mm. The inlet diameter to the controlled flow cavitation apparatus 12 is designated as $D_1$. Diameter $D_1$ can be 0.25 to 8 inches. The localized flow constriction 32 divides the flow through channel 36 into two chambers, a first chamber 34 having pressure $P_1$ and a second chamber 35 having pressure $P_2$. Although not shown, the controlled flow cavitation apparatus 12 of FIG. 7 can have an additional localized restriction, such as a valve, at the outlet of the second chamber 25 in order to alter the cavitation influence on the dispersion and conversion rate of fatty acids to fatty acid alkyl esters formed by the transesterification reaction. The additional localized restriction may be adjustable or non-adjustable. As described above, a reaction mixture 10 can be forced or passed through the controlled flow cavitation apparatus 12 of FIG. 7 in order to convert fatty acids into fatty acid alkyl esters.

A controlled flow cavitation apparatus can be integrated or retrofitted into a biodiesel production process, such as shown in FIG. 1 and FIG. 2. As shown in FIGS. 1 and 2, the controlled flow cavitation apparatus 12 can be aligned in series with other apparatuses 12 when the integer "n" is greater than 1. In another embodiment as shown in FIG. 3, controlled flow cavitation apparatuses 12 can be arranged in a parallel construction with each other. In another embodiment, as shown in FIG. 4, the cavitation apparatus 12 can be retrofitted to allow for recirculation of the reaction product through a single cavitation apparatus 12, or a series of apparatuses 12 for n>1. In another embodiment, a controlled flow cavitation apparatus 12 can be retrofitted or integrated at the end of a batch reactor process to increase conversion of fatty acid to fatty acid alkyl ester.

After the reaction mixture 10 passes through the cavitation apparatuses(s) 12, the final reaction product 30 is collected. The reaction product 30 can be placed in a centrifuge for the purpose of separating glycerol, unreacted fatty acid, catalyst, and/or unreacted alcohol from the fatty acid alkyl esters. The separated or isolated fatty acid alkyl esters can be subsequently washed and/or dried. Chromatography can be used to determine the quantity and purity of the fatty acid alkyl esters. One preferred fatty acid ester is a fatty acid methyl ester (FAME).

Using the cavitation apparatus 12 as described herein, fatty acids are consistently converted to fatty acid alkyl esters at a conversion rate above 90% and often above 98%. With each additional cavitation apparatus 12 that the reaction mixture 10 and/or reaction product 30 passes through, the conversion rate can be further increased. Consistent conversion rates over 99% are obtainable with the use of two or more cavitation apparatuses 12, preferably in series.

In order to promote a further understanding of the invention, the following examples are provided. These examples are shown by way of illustration and not limitation.

Example 1

A reaction mixture was prepared by combining the reactants from the two holding tanks to comprise a molar ratio of 1 part oil, 6 parts methanol, and 0.219 parts NaOH. Four separate runs were conducted using the reaction mixture. The results of the runs are shown in Table 1 below. In a first run, the reaction mixture was passed through one cavitation apparatus at a temperature of 100° C., a residence of time of 0.12 microseconds in the hydrodynamic cavitation zone and a pressure differential across the orifice of 250 psi. In a second run using the same molar ratio, the reaction mixture was passed through two cavitation apparatus in series with each other at a temperature of 100° C. A residence time of 0.12 microseconds and a pressure differential of 250 psi were obtained for the first cavitation apparatus and a residence time of 0.17 microseconds and a pressure differential of 120 psi were obtained for the second cavitation apparatus. In a third run using the same molar ratio, the reaction mixture was fed through three cavitation apparatuses in series with each other at a temperature of 100° C. A residence time of 0.12 microseconds and a pressure differential of 250 psi was obtained for the first cavitation apparatus; a residence time of 0.17 microseconds and a pressure differential of 120 psi was obtained for the second cavitation apparatus; and a residence time of 0.12 microseconds and a pressure differential of 250 psi were obtained for the third cavitation apparatus. In a fourth run using the same molar ration, the reaction mixture was fed through four cavitation apparatuses in series with each other at a temperature of 100° C. A residence time of 0.12 microseconds and a pressure differential of 250 psi were obtained for the first cavitation apparatus; a residence time of 0.17 microseconds and a pressure differential of 120 psi were obtained for the second cavitation apparatus; a residence time of 0.12 microseconds and a pressure differential of 250 psi were obtained for the third cavitation apparatus; and a residence time of 0.25 microseconds in the hydrodynamic cavitation zone and a pressure differential of 60 psi were obtained for the fourth cavitation apparatus.

TABLE 1 shows the results of the first experiment.

| | Fatty acid source/ Methanol/ NaOH | | Residence time in the local hydrodynamic cavitation zone, microseconds Apparatus | | | | Pressure drop in the local constriction orifice, PSI Apparatus | | | | Conversion |
|---|---|---|---|---|---|---|---|---|---|---|---|
| Run | Molar Ratio | T, ° C. | #1 | #2 | #3 | #4 | #1 | #2 | #3 | #4 | rate % |
| 1 | 1:6:0.219 | 100 | 0.12 | — | — | — | 250 | — | — | — | 98.7 |
| 2 | 1:6:0.219 | 100 | 0.12 | 0.17 | — | — | 250 | 120 | — | — | 99.6 |
| 3 | 1:6:0.219 | 100 | 0.12 | 0.17 | 0.12 | — | 250 | 120 | 250 | — | 99.8 |
| 4 | 1:6:0.219 | 100 | 0.12 | 0.17 | 0.12 | 0.25 | 250 | 120 | 250 | 60 | 99.8 |

As can be seen in Table 1, the conversion rate of fatty acids to fatty acid methyl esters was greater than 98% after passing the reaction mixture in a single pass through a single cavitation apparatus. In the single pass, single apparatus run #1, the processing pressure was greater than 250 psi and the pressure differential across the apparatus was 250 psi. The conversion rate was greater than 99% after passing the reaction mixture through at least 2 cavitation apparatuses in series. The conversion rate increased after each successive pass through an additional cavitation apparatus with a 99.8% conversion rate after passing through four cavitation apparatuses in series.

Example 2

Further experimentation was done with reaction mixtures at different temperatures. Six runs were completed using four cavitation apparatuses in series. Residence times in the hydrodynamic cavitation zones of each apparatus was held constant at 0.12, 0.17, 0.17, and 0.25 microseconds for the first, second, third, and fourth cavitation apparatuses, respectively. Pressure drops of 250, 150, 120, and 60 psi were also maintained for the first, second, third, and fourth cavitation apparatuses, respectively. A molar ratio for oil/methanol/NaOH was held at 1:6:0.219 for runs one, four, five, and six and a molar ratio of 1:6:0.217 was held for runs two and three. The temperature of the reaction mixture started at 60° C. for the first run and increased to 80° C. for the second, 90° C. for the third, 100° C. for the fourth, 120° C. for the fifth, and finally 150° C. for the sixth run.

TABLE 2 shows the results of the second experiment.

| | Fatty acid source/ Methanol/ NaOH | | Residence time in the local hydrodynamic cavitation zone, microseconds Local constriction | | | | Pressure drop in the local constriction, PSI Local constriction | | | | |
|---|---|---|---|---|---|---|---|---|---|---|---|
| Run | Molar Ratio | T, °C. | #1 | #2 | #3 | #4 | #1 | #2 | #3 | #4 | Conversion |
| 1 | 1:6:0.219 | 60 | 0.12 | 0.17 | 0.17 | 0.25 | 250 | 120 | 120 | 60 | 99 |
| 2 | 1:6:0.217 | 80 | 0.12 | 0.17 | 0.17 | 0.25 | 250 | 120 | 120 | 60 | 99.8 |
| 3 | 1:6:0.217 | 90 | 0.12 | 0.17 | 0.17 | 0.25 | 250 | 120 | 120 | 60 | 99.8 |
| 4 | 1:6:0.219 | 100 | 0.12 | 0.17 | 0.17 | 0.25 | 250 | 120 | 120 | 60 | 99.9 |
| 5 | 1:6:0.219 | 120 | 0.12 | 0.17 | 0.17 | 0.25 | 250 | 120 | 120 | 60 | 99.8 |
| 6 | 1:6:0.219 | 150 | 0.12 | 0.17 | 0.17 | 0.25 | 250 | 120 | 120 | 60 | 99.4 |

As can be seen in Table 2, the conversion rate of fatty acids to fatty acid alkyl esters was about 99% or greater in each of the six runs after passing through four cavitation apparatuses in series. The greatest conversion rate, 99.9%, occurred at a temperature of 100° C. and an oil/methanol/NaOH molar ratio of 1:6:0.219. As temperatures increased from 60 to 100° C., the conversion rate increased from 99% to 99.9%. Temperature intervals above 100° C. showed a decrease in the conversion rate: 99.8% at 120° C. and 99.4% at 150° C. The conversion rate was the highest at 100° C. and in the temperature range of 80 to 120° C., the conversion rate was at least 99.8%. A rate of 98% for the conversion of fatty acids to fatty acid alkyl esters was consistently obtained by passing the reaction mixture through at a controlled cavitation apparatus.

A controlled cavitation apparatus 12 allows a user to control the conversion rate by varying the temperature of the reaction mixture, which can be done by passing the reaction mixture 10 through a heat exchanger. Another parameter under the control of the user is the pressure drop pressure across the local constriction 2. For example, a user can vary the processing pressure in the apparatus 12 by varying the outlet pressure of the pump used pass the reaction mixture 10 through the controlled flow cavitation apparatus 12. A user can also vary the diameter of the orifice. A user can further adjust the number and/or arrangement of cavitation apparatuses 12 that the reaction mixture 10 will flow through.

It should now be apparent that there has been provided, in accordance with the present invention, a novel process for increase the rate of conversion fatty acids to fatty acid alkyl esters, otherwise known as biodiesel fuel. Moreover, it will be apparent to those skilled in the art that many modifications, variations, substitutions, and equivalents for the features described above may be effected without departing from the spirit and scope of the invention as defined in the claims to be embraced thereby.

The preferred embodiments have been described, herein. It will be apparent to those skilled in the art that the above methods may incorporate changes and modifications without departing from the general scope of this invention. It is intended to include all such modifications and alterations in so far as they come within the scope of the appended claims or the equivalents thereof.

What is claimed is:

1. A method for preparing a fatty acid alkyl ester from a feedstock comprising:

providing a feedstock comprising at least one source of fatty acids;

mixing said feedstock with a treatment composition comprising alcohol and a catalyst to form a reaction mixture, wherein the temperature of the reaction mixture is in the range of 40° to 200° C.;

forcing said reaction mixture through at least two controlled flow cavitation apparatuses at a processing pressure capable of generating a hydrodynamic cavitation zone in each said controlled flow cavitation apparatus, said at least two controlled flow cavitation apparatuses being in series;

maintaining said reaction mixture in said hydrodynamic cavitation zone in each of said at least two controlled flow cavitation apparatuses for less than 1 second, and maintaining a pressure differential across each said controlled flow cavitation apparatus in the range of 30 to 500 psi, wherein at least one of said fatty acids is converted into a fatty acid alkyl ester.

2. The method of claim 1, said at least one source of a fatty acid is selected from the group consisting of soybean, corn, sunflower, palm, jatropha, nut, safflower, olives, cotton, linseed, mustard seed, rapeseed, canola, coconut, castor beans, tall oil, algae, raw or rendered animal fats, brown grease, white grease, yellow grease, lard or tallow from pork, chicken, mutton, beef, horse, and wastes, effluents and residues from the processing of said at least one source of a fatty acid.

3. The method of claim 1, said reaction mixture being maintained in at least one of said hydrodynamic cavitation zone for less than 0.1 second.

4. The method of claim 1, wherein at least 95% of said fatty acids in said reaction mixture are converted to fatty acid alkyl esters.

5. The method of claim 1, said at least two controlled flow cavitation apparatuses being arranged in series such that said at least two apparatuses comprise a first controlled flow cavitation apparatus and a second controlled flow cavitation apparatus.

6. The method of claim 5, said at least two controlled flow cavitation apparatuses being in direct fluid connection such that said reaction mixture passes through said first controlled flow cavitation apparatus and directly into said second controlled flow cavitation device.

7. The method of claim 6, said processing pressure being greater than 120 psi and said pressure differential across said first controlled flow cavitation apparatus being at least 60 psi and said pressure differential across said second controlled flow cavitation apparatus being at least 60 psi, wherein at least 98% of said fatty acids in said reaction mixture are converted to fatty acid alkyl esters.

8. The method of claim 1, said at least two controlled flow caviation apparatuses each comprising a localized flow constriction, wherein said pressure differential occurs across said localized flow constriction.

9. The method of claim 8, said localized flow constriction being an orifice, baffle or nozzle.

10. A method of increasing the conversion rate of fatty acid to fatty acid alkyl ester comprising:
- combining a feedstock comprising fatty acids with an alcohol and a catalyst to form a reaction mixture, wherein the temperature of the reaction mixture is in the range of 40° to 200° C.;
- passing said reaction mixture through at least two controlled flow cavitation apparatuses, said at least two controlled flow cavitation apparatuses being in series, maintaining said reaction mixture in each of said at least two controlled flow cavitation apparatuses for less than 1 second, and wherein the conversion rate of fatty acids in said reaction mixture to fatty acid alkyl esters is greater than 90%.

11. The method of claim 10, said conversion rate of fatty acid to fatty acid alkyl ester being greater than 98%.

12. The method of claim 10, said controlled flow cavitation apparatuses each comprising a flow through channel and a localized flow constriction, wherein said reaction mixture passes through said constriction and creates a pressure differential across said constriction, said pressure differential being in the range of 30 to 500 psi.

13. The method of claim 12, said localized flow constriction being an orifice, baffle or nozzle.

14. The method of claim 12, said pressure differential being greater than 60 psi.

15. The method of claim 10, said reaction mixture being passed through said at least two controlled flow cavitation apparatuses at a processing pressure capable of generating a hydrodynamic cavitation zone in each said apparatus, wherein said conversion rate of said fatty acid in said reaction mixture to said fatty acid alkyl ester occurs in said hydrodynamic cavitation zone.

16. A method of claim 15, said reaction mixture being maintained in at least one of said hydrodynamic cavitation zones for less than 0.1 second.

17. The method of claim 10, said at least two controlled flow cavitation apparatuses comprising a first controlled flow cavitation apparatus in series with a second controlled flow cavitation apparatus, wherein said first apparatus and said second apparatus are in direct fluid connection.

18. A method of increasing the conversion rate of fatty acid to fatty acid alkyl ester comprising:
- combining a feedstock comprising fatty acids with an alcohol and a catalyst to form a reaction mixture, wherein the temperature of the reaction mixture is in the range of 40° to 200° C.;
- passing said reaction mixture through a controlled flow cavitation apparatus at a processing pressure of at least 250 psi, wherein said reaction mixture is maintained in said controlled flow cavitation apparatus for less than 1 second;
- maintaining a pressure differential across said controlled flow cavitation apparatus of at least 250 psi;
- converting at least 95% of said fatty acids in said reaction mixture to fatty acid alkyl esters, wherein said conversion occurs in a single pass through said controlled flow cavitation apparatus.

* * * * *

UNITED STATES PATENT AND TRADEMARK OFFICE
CERTIFICATE OF CORRECTION

PATENT NO. : 7,754,905 B2
APPLICATION NO. : 12/167516
DATED : July 13, 2010
INVENTOR(S) : Oleg V. Kozyuk It is certified that error appears in the above-identified patent and that said Letters Patent is hereby corrected as shown below:

In column 12, line 61, in claim 7, please delete "The method of claim 6, said processing pressure being" and insert therefor --The method of claim 5, said processing pressure being--.

Signed and Sealed this

Fifth Day of October, 2010

David J. Kappos
*Director of the United States Patent and Trademark Office*